United States Patent Office 3,386,300
Patented June 4, 1968

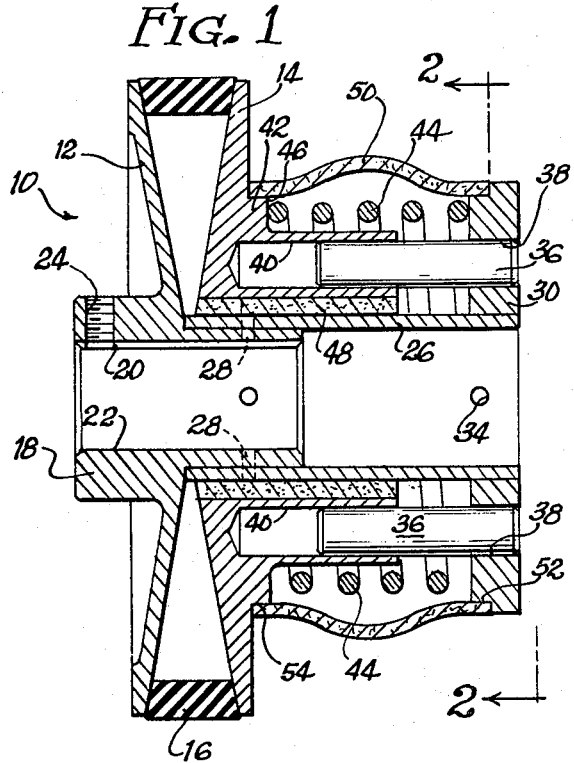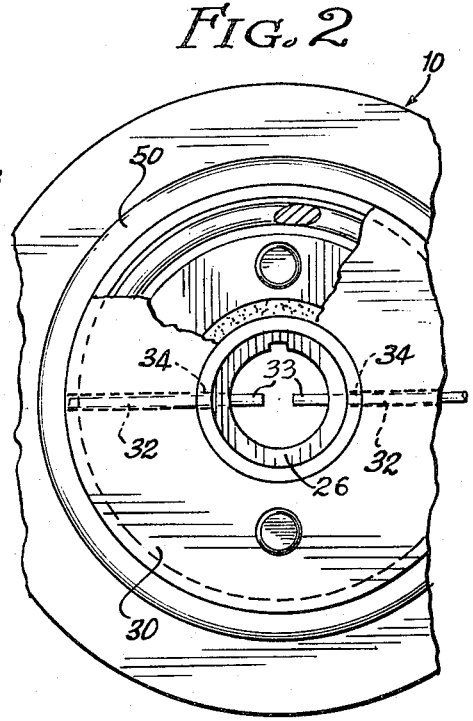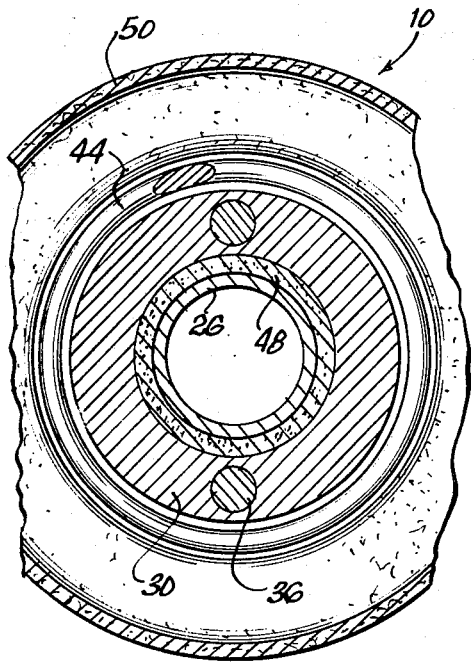

3,386,300
VARIABLE SPEED SHEAVE
Joseph E. Maurey, Chicago, and Peter E. Lastowsky, Chicago Heights, Ill., assignors to Maurey Manufacturing Corporation, Chicago, Ill., a corporation of Illinois
Filed Jan. 10, 1966, Ser. No. 519,598
7 Claims. (Cl. 74—230.17)

ABSTRACT OF THE DISCLOSURE

A variable speed sheave comprising a cylindrical support with a first flange member movably carried by the support and with a second flange member rigidly attached to the support. A graphite sleeve is inserted between the first flange member and the support surface to provide self-lubricating characteristics.

An end plate is fixed at the end of the support remote from the position of the first flange, and a spring is interposed between the plate and the first flange to normally urge the first flange toward the second flange. The hub of the first flange defines bores which slideably receive pins carried by the plate, and these pins serve to transmit driving movement from the support to the first flange. Tension pins provide the means for connecting the end plate to the cylindrical support to reduce stress build-up.

Specification

This invention relates to a variable speed sheave construction. The invention is particularly concerned with a sheave construction which is characterized by an improved design whereby the construction is characterized by an especially long life and by substantially maintenance-free operation.

A wide variety of designs are available in the case of variable speed sheaves. Such sheaves characteristically comprise a pair of flange members with one or both of the flange members being movable on associated support means. By varying the spacing between the flange members, a pulley associated therewith will assume various positions with respect to the axis of the sheave. Accordingly, the drive shaft associated with the sheave has various performance characteristics depending upon the relative positions of the flange members.

Because of the movements of the flange members, lubrication of variable speed sheaves becomes a problem. Furthermore, the existence of movable parts increases design problems from the standpoint of the ability to secure a high degree of structural strength.

It is a general object of this invention to provide a variable speed sheave construction which is characterized by highly desirable operating features.

It is a more particular object of this invention to provide a variable speed sheave construction which includes lubricating means and associated operating elements whereby the construction provides a long operating life and requires a minimum amount of maintenance.

It is a further particular object of this invention to provide a variable speed sheave construction which includes elements arranged whereby a high degree of structural strength can be achieved in the construction without sacrificing operating efficiency and without significantly increasing manufacturing costs.

These and other objects of this invention will appear hereinafter and for purposes of illustration, but not of limitation, specific embodiments of this invention are shown in the accompanying drawings in which:

FIGURE 1 is a vertical sectional view of the construction;

FIGURE 2 is an end view, partly cut away, taken about the line 2—2 of FIGURE 1;

FIGURE 3 is a side elevation of the construction, partly cut away, illustrating the construction in an open position; and, FIGURE 4 is a cross-sectional view taken about the line 4—4 of FIGURE 3.

The sheave construction of this invention generally comprises support means for holding flange members. The support means are adapted to be connected to a drive shaft whereby a belt can be driven when the belt is positioned between the flange members. In accordance with conventional variable speed sheave designs, the flange members are movable apart whereby the belt can assume various positions relative to the axis of the sheave.

In accordance with this invention, one of the flange members carries a graphite sleeve, and this sleeve is slideably received by the support means. This arrangement provides a highly ideal means for achieving lubrication during operation of the construction.

The structure of this invention is also characterized by a particular arrangement employed for securing the flange members together whereby the flange members will rotate together. The securing means include pins which are slideably received by a flange member whereby the flange member can shift relative to the other flange member with the pins constantly providing a driving connection.

In the accompanying drawings, there is shown a variable speed sheave construction 10 which is characterized by the features of this invention. The sheave construction comprises a pair of flange members 12 and 14. The flange members define conical faces whereby a belt 16 is adapted to be received therebetween. FIGURE 1 illustrates the flange members in a position whereby the belt is at a maximum distance from the sheave axis. In FIGURE 3, the flange members are spread apart whereby the belt is at a minimum distance from the sheave axis.

The hub 18 of the flange member 12 defines a keyway 20. A drive shaft is adapted to be inserted into the bore 22 of the hub, and the keyway 20 serves as a means for locking the drive shaft relative to the hub. A threaded bore 24 is provided in the hub 18 for the insertion of a set screw.

A cylinder 26 is secured to the hub 18. Locking pins 28 are adapted to be received in holes formed in both the hub 18 and the cylinder 26 for holding these members together.

A plate 30 is attached at the outer end of the cylinder 26. Bores 32 extend radially through the plate, and tension pins 33 are forced into these bores. Openings 34 are defined by the cylinder 26 for alignment with the bores 32. The tension pins thus serve to hold the ring 30 in position with respect to the cylinder 26. The tension pins which are preferably used are of a conventional design which are adapted to be pressed into undersized holes whereby they will be rigidly positioned in the construction once they have been driven into place. As shown the tension pins can be of extra length whereby they will extend beyond the interior surface of the cylinder 26 and thereby act as wheel pullers to facilitate removal of the sheave.

Guide pins 36 are rigidly secured to the plate 30 in the openings 38 provided for this purpose. The guide pins extend into bores 40 which are formed in the hub portion 42 of the flange member 14.

A compression coil spring 44 has one end bearing against the inner face of the plate 30 while the other end bears against a shoulder 46 defined by the hub portion 42. Accordingly, the compression spring 44 normally acts to force the flange member away from the plate 30 whereby the flange member 14 is normally in closed position with respect to the flange member 12. The amount of pressure exerted by the belt 16 determines the spacing between the flange members since this pressure acts in opposition to the spring 44.

The hub portion 42 of the flange member 14 carries a graphite sleeve 48. This sleeve is press fit with respect to the hub portion 42. The sleeve is adapted to undertake sliding movement with respect to the cylindrical member 26.

A bellows member 50 is adapted to be attached between the flange member 14 and the plate 30. This bellows member serves as a dust cover for the construction whereby the spring and other elements are protected from the accumulation of dust or other foreign materials. Shoulder portions 52 and 54 are preferably provided in the plate 30 and flange member 14, respectively, for purposes of seating of the dust cover and to further insure the sealing action thereof.

It has been found that the characteristics of the graphite sleeve provide an ideally suitable operating arrangement. Thus, the flange members 12 and 14 can be moved back and forth with respect to each other, and the graphite sleeve eliminates the need for lubrication for purposes of achieving such movement. The provision of the graphite sleeve greatly increases the operating life of the construction since extremely little wear is realized even after many hours of operation. Fretting and corrosion are held to a minimum, and the combination, therefore, substantially reduces maintenance costs.

The provision of the pins 36 in the manner illustrated also provides an extremely satisfactory arrangement. The pins are completely effective for the purpose of transmitting driving action to the flange member 14 and, therefore, the conventional locking key is eliminated. It is believed that the use of tension pins for securing the plate 30 to the cylindrical member 26 is also important in this regard since the slight give which is available with the tension members apparently greatly reduces the build-up of stresses in the construction.

The ability of the construction to withstand high stress may be due to various factors and is probably due to the combination of particular elements employed. At any rate, it has been found that the construction is characterized by a highly satisfactory structural strength even though the construction is of a relatively simple design when other variable speed sheave constructions are considered.

It will be understood that various changes and modifications may be made in the above described construction which provide the characteristics of this invention without departing from the spirit thereof particularly as defined in the following claims.

That which is claimed is:

1. A variable speed sheave comprising a cylindrical support means, means for securing a drive shaft to said support means, first and second flange members carried by said support means, said flange members being provided to receive a drive belt, said first flange member being slideably received by said support means and said second flange member being rigidly mounted on said support means, a graphite sleeve carried by said first flange member, said sleeve being interposed between said first flange member and said support means, an end plate fit around said support means in contact therewith, means tying said end plate to said support means in spaced-apart relationship with respect to said first flange member, spring means interposed between said first flange member and said plate normally urging said first flange member toward the second flange member, at least one pin carried by said plate and extending toward said first flange member, and at least one bore defined by said first flange member, one end of said pin being fixed to said plate means and the other end of said pin being freely movable within said bore whereby the bore slideably receives said pin and whereby said pin transmits driving action to said first flange member.

2. A sheave in accordance with claim 1 wherein said cylindrical means comprise a first part integrally formed with said second flange member and providing the hub portion thereof and a second part comprising a cylinder attached to said hub portion, said graphite sleeve being movably fit around the outer surface of said cylinder, and wherein said drive shaft is keyed to said hub portion.

3. A sheave in accordance with claim 1 wherein the hub of said first flange member defines a pair of bores, and wherein said plate carries a pair of said pins in diametrically opposed positions with said pins being received in corresponding bores in said hub.

4. A sheave in accordance with claim 3 including additional bores defined by said plate and extending inwardly from the outer surface of said plate toward the axis of the sheave, tension pin members received in said bores, said tension pin members extending through openings defined by the cylinder forming said second part of said cylindrical means for thereby securing said cylinder to said plate.

5. A sheave in accordance with claim 1 wherein said spring means comprises a compression coil spring located between said first flange member and said plate.

6. A sheave in accordance with claim 1 including a dust cover extending between said first flange member and said plate for enclosing said spring means.

7. A sheave in accordance with claim 6 wherein said dust cover comprises a bellows member.

References Cited

UNITED STATES PATENTS

| 2,135,214 | 11/1938 | Moore | 74—230.17 |
| 2,196,606 | 4/1940 | Mason et al. | 74—230.17 |
| 2,198,747 | 4/1940 | Stobb | 74—230.17 |
| 2,711,103 | 6/1955 | Miner | 74—230.17 |
| 2,715,842 | 8/1955 | Homuth | 74—230.17 |
| 3,269,201 | 8/1966 | Looker | 74—230.17 |

FRED C. MATTERN, Jr., *Primary Examiner.*

CORNELIUS J. HUSAR, *Examiner.*